Figure 3:
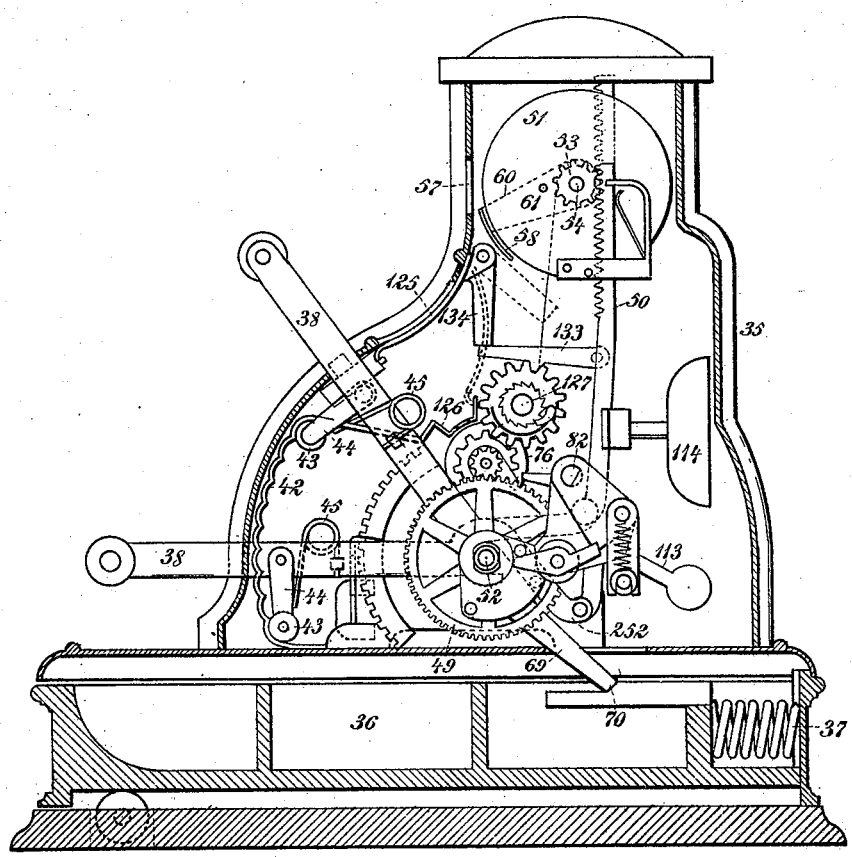

No. 688,892. Patented Dec. 17, 1901.
E. F. SPAULDING.
CASH REGISTER.
(Application filed Sept. 7, 1900.)
(No Model.) 8 Sheets—Sheet 1.
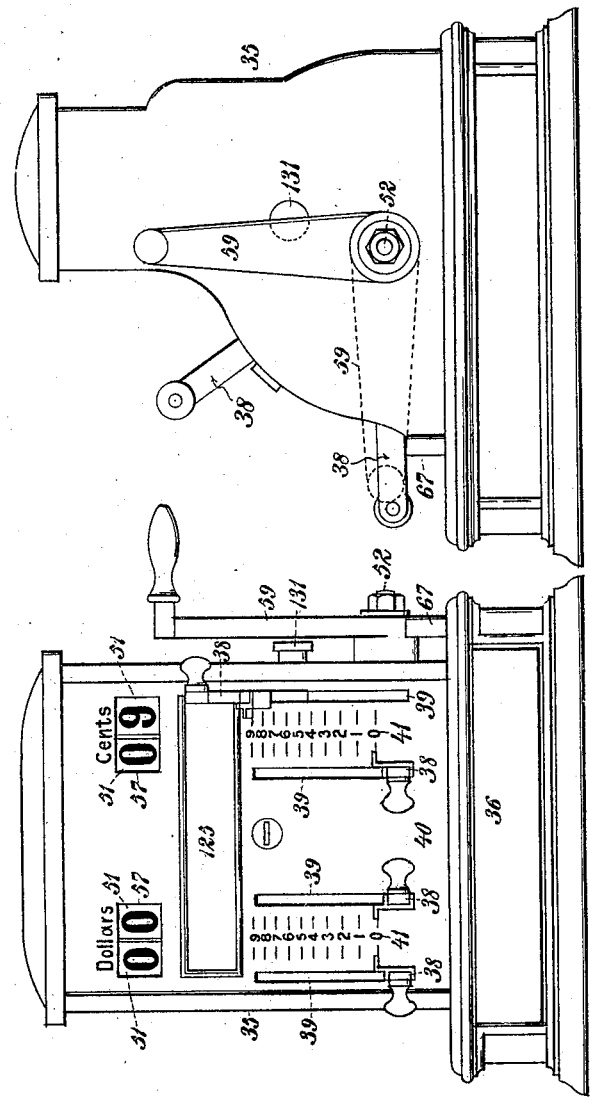

No. 688,892. Patented Dec. 17, 1901.
E. F. SPAULDING.
CASH REGISTER.
(Application filed Sept. 7, 1900.)
(No Model.) 8 Sheets—Sheet 2.

WITNESSES:
Gunder Gunderson.
Anna V. Broderick

INVENTOR
Elijah F. Spaulding
BY
Chas. C. Gill
ATTORNEY

No. 688,892. Patented Dec. 17, 1901.
E. F. SPAULDING.
CASH REGISTER.
(Application filed Sept. 7, 1900.)
(No Model.) 8 Sheets—Sheet 3.
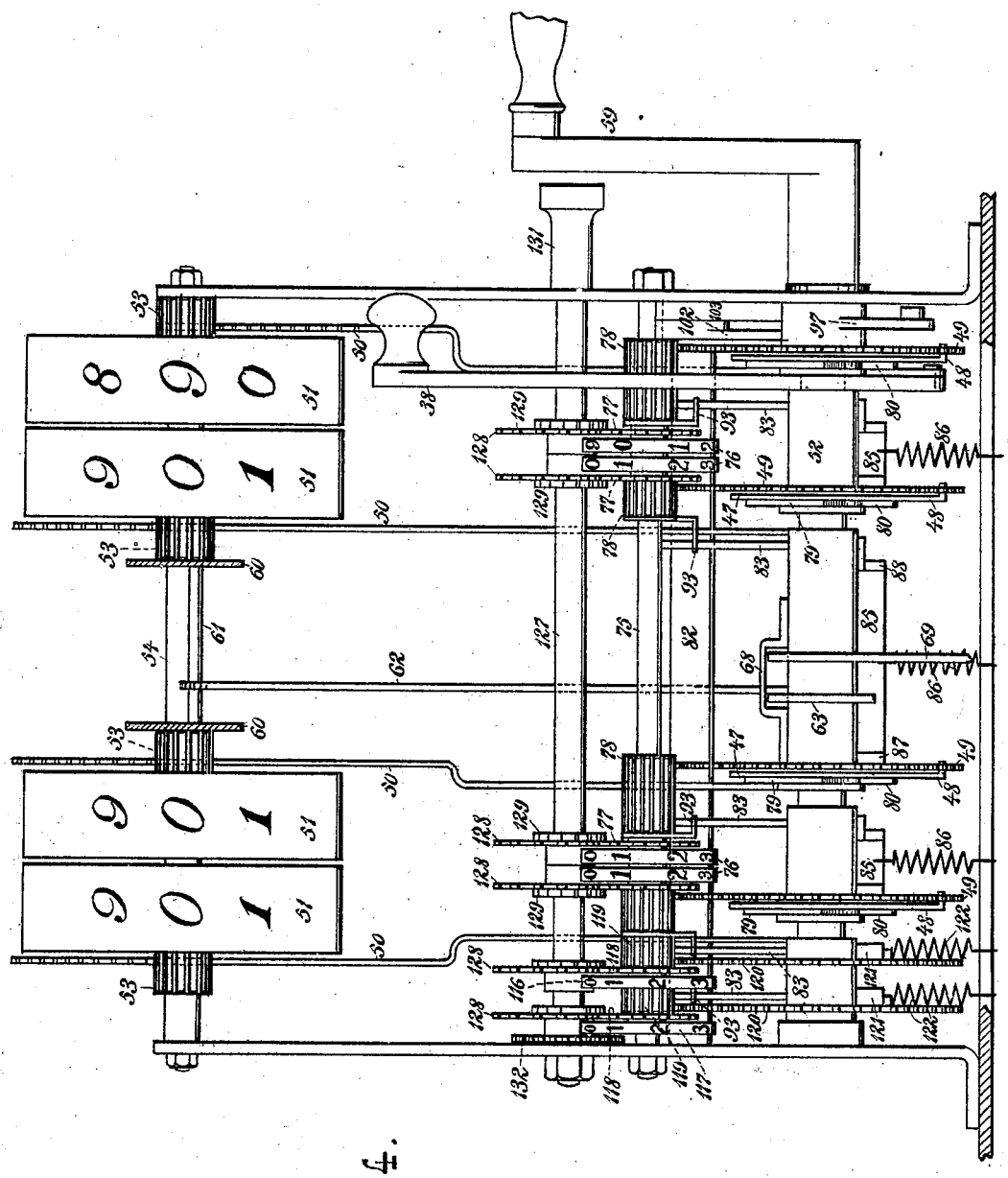

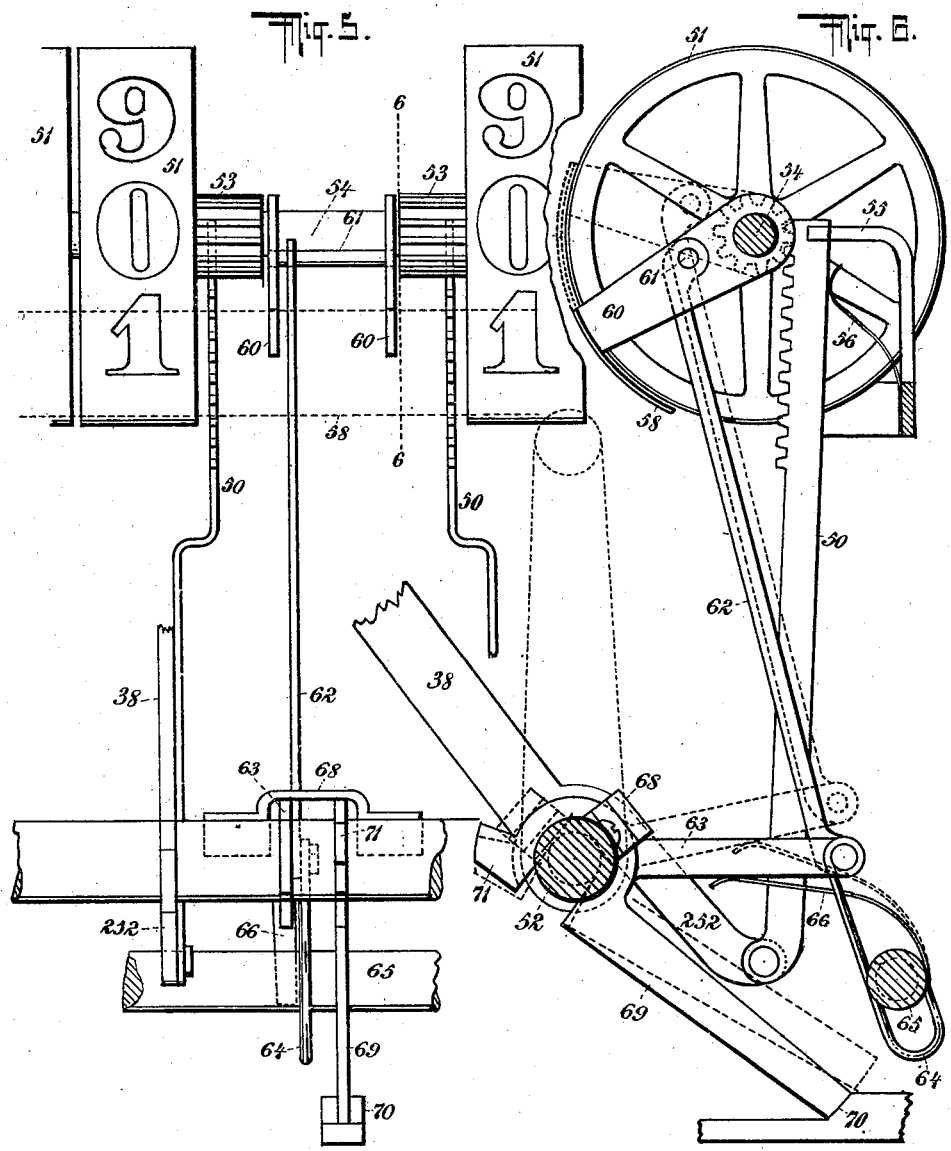

No. 688,892. Patented Dec. 17, 1901.
E. F. SPAULDING.
CASH REGISTER.
(Application filed Sept. 7, 1900.)
(No Model.) 8 Sheets—Sheet 5.
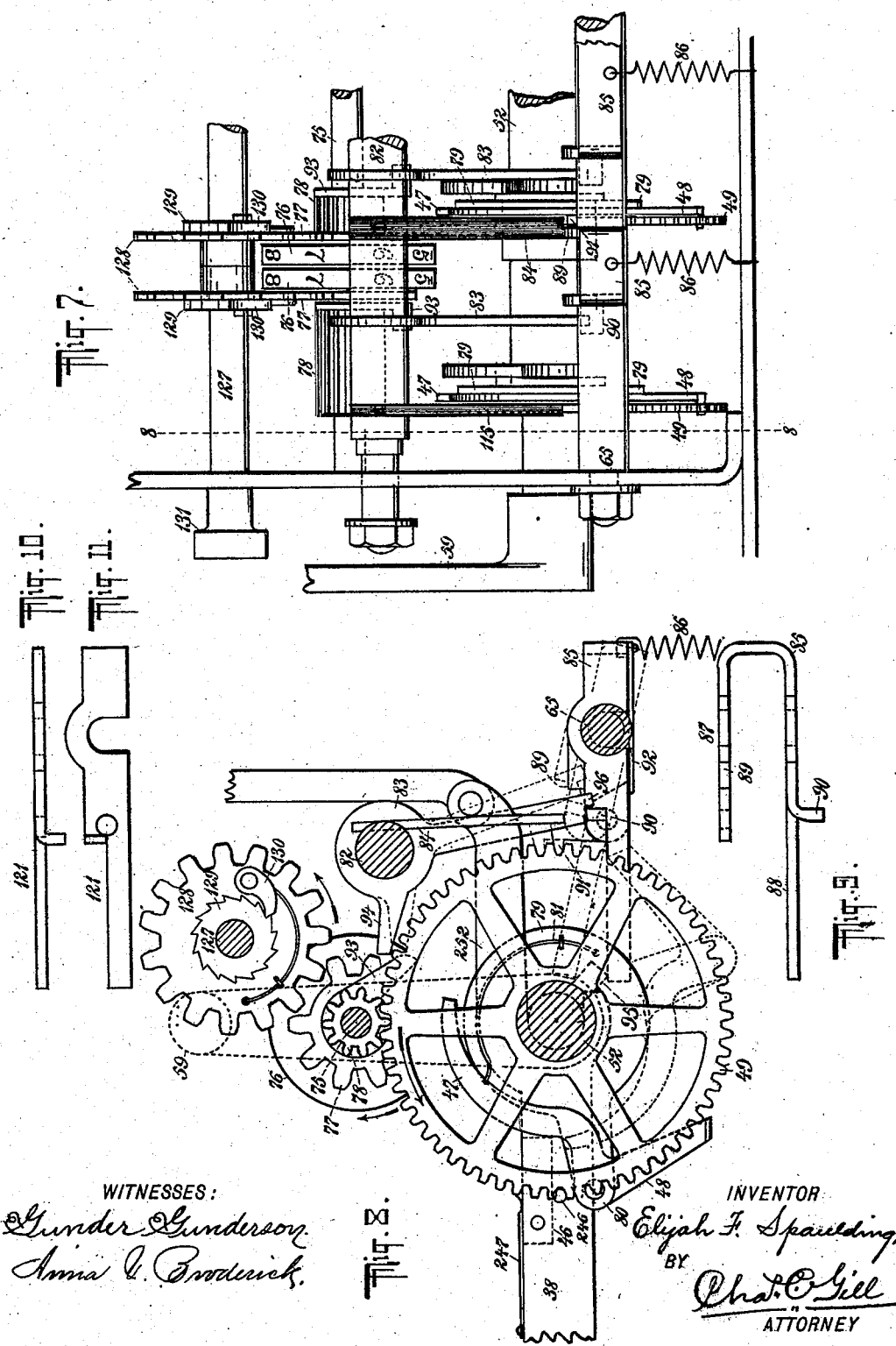
WITNESSES:
Gunder Gunderson.
Anna L. Broderick.
INVENTOR
Elijah F. Spaulding,
BY
Chas. C. Gill
ATTORNEY

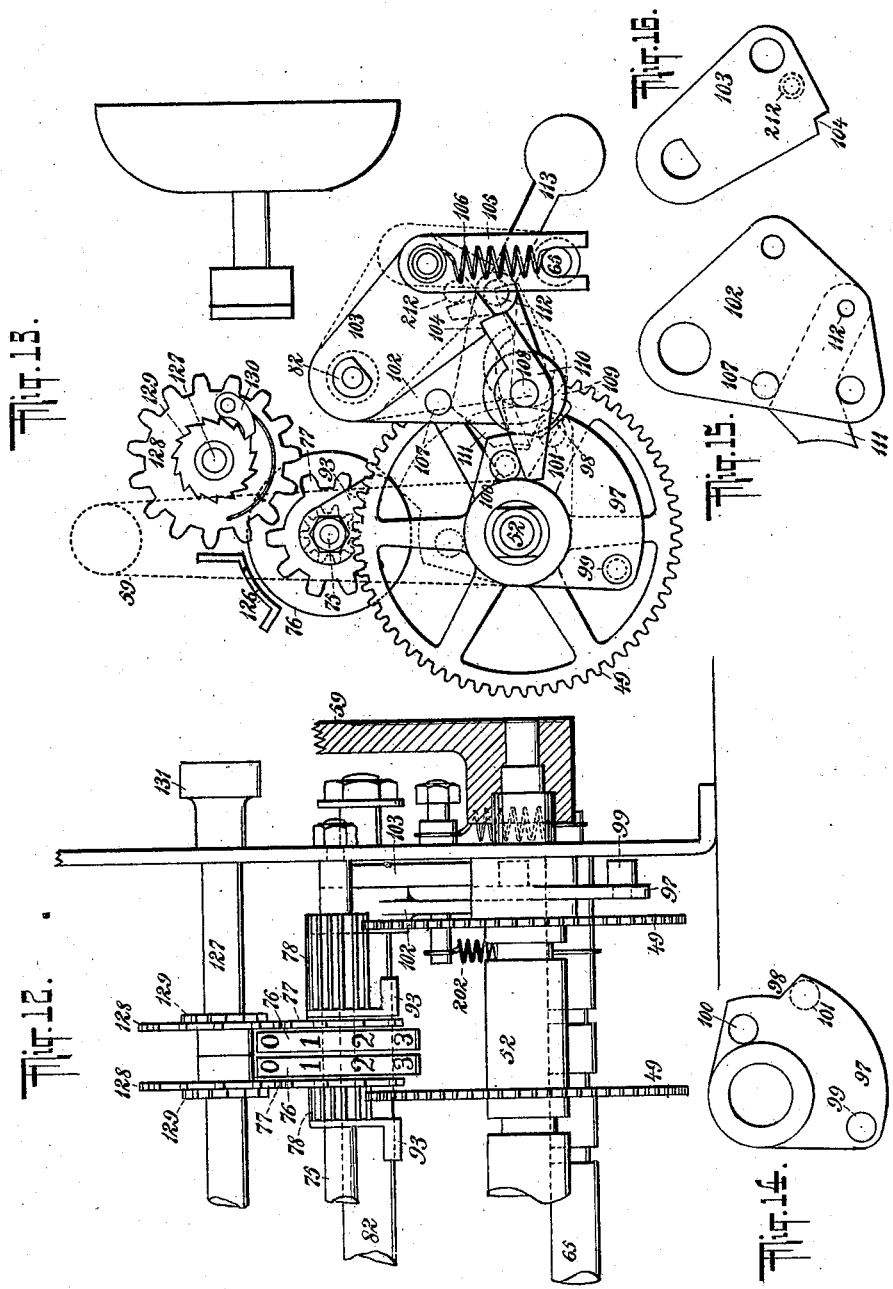

No. 688,892. Patented Dec. 17, 1901.
E. F. SPAULDING.
CASH REGISTER.
(Application filed Sept. 7, 1900.)
(No Model.) 8 Sheets—Sheet 7.
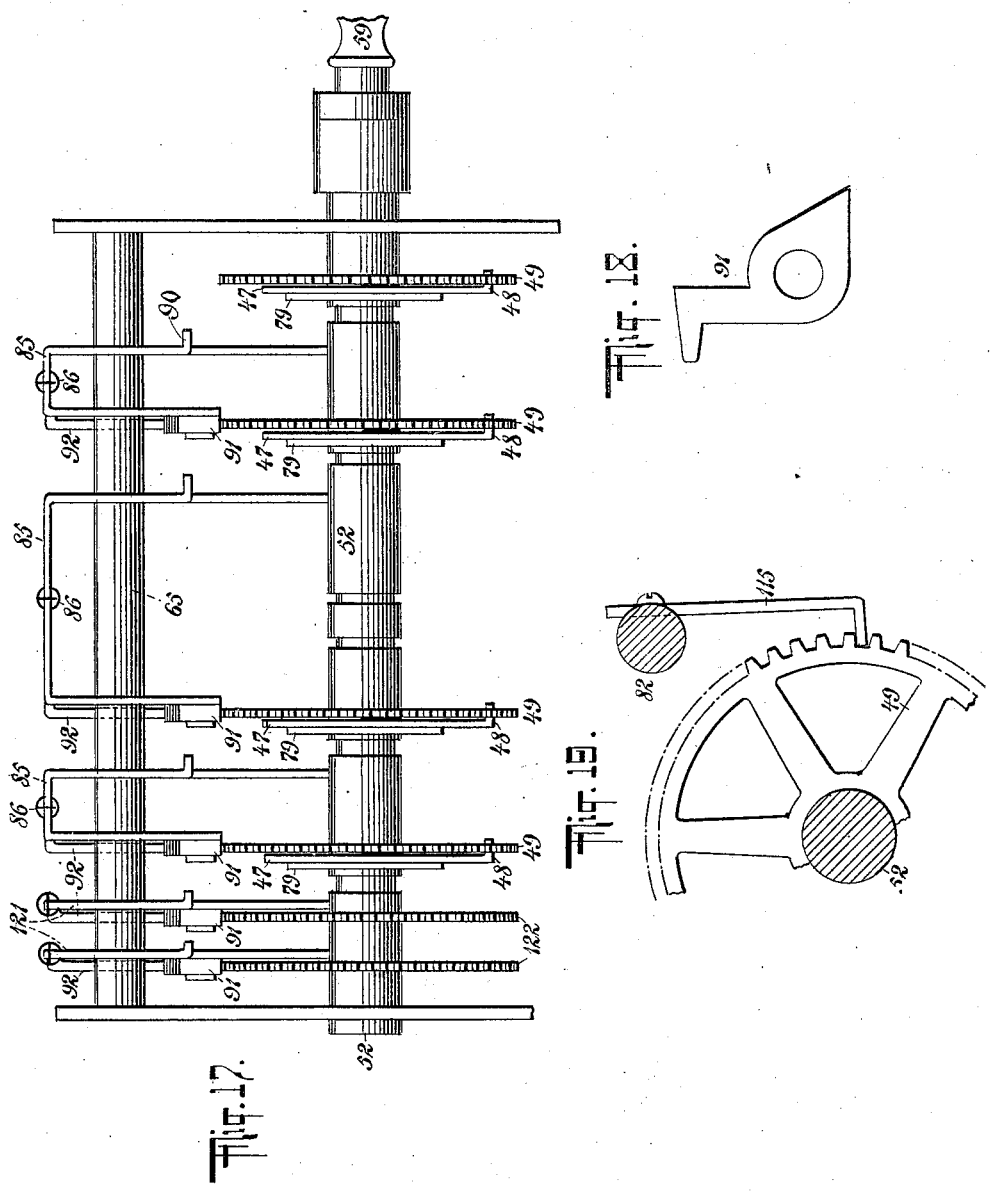

No. 688,892. Patented Dec. 17, 1901.
E. F. SPAULDING.
CASH REGISTER.
(Application filed Sept. 7, 1900.)
(No Model.) 8 Sheets—Sheet 8.
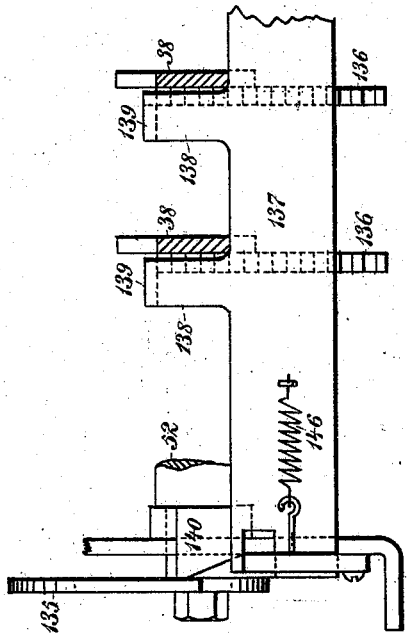
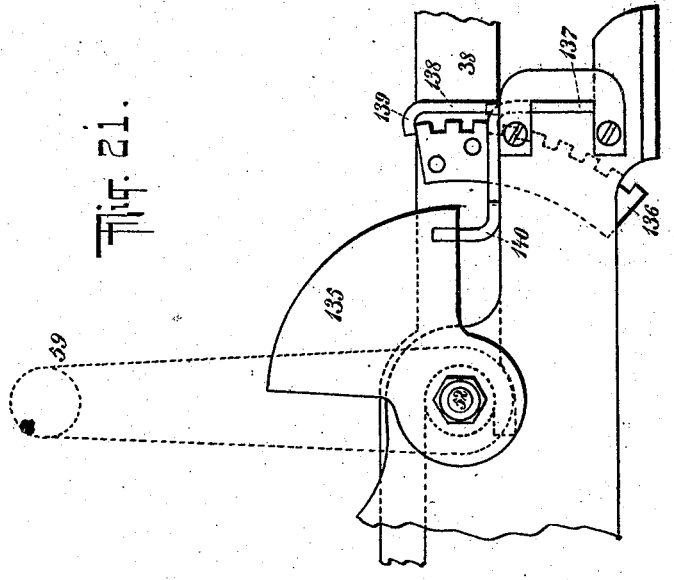
WITNESSES:
Gunder Gunderson.
Anna V. Broderick.
INVENTOR
Elijah F. Spaulding,
BY
Chas. C. Gill
ATTORNEY

UNITED STATES PATENT OFFICE.

ELIJAH F. SPAULDING, OF NEW BOUNDBROOK, NEW JERSEY, ASSIGNOR TO THE IDEAL CASH REGISTER COMPANY, OF NEW BOUNDBROOK, NEW JERSEY, A CORPORATION OF NEW JERSEY.

CASH-REGISTER.

SPECIFICATION forming part of Letters Patent No. 688,892, dated December 17, 1901.

Application filed September 7, 1900. Serial No. 29,251. (No model.)

*To all whom it may concern:*

Be it known that I, ELIJAH F. SPAULDING, a citizen of the United States, and a resident of New Boundbrook, in the county of Middlesex and State of New Jersey, have invented certain new and useful Improvements in Cash-Registers, of which the following is a specification.

The invention relates to improvements in cash-registers; and it consists in the novel features, structure, and combinations of parts hereinafter described and claimed.

In accordance with my present invention the operator moves the exposed actuating or setting levers along the lines of numerals provided upon the front face of the register-casing for the purpose of setting certain interior blocks carried thereby with respect to certain pawl-arms, which during the succeeding downward motion of the exposed operating crank-handle engage the driving gear-wheels for actuating the registering-wheels, the position given to said blocks carried by the actuating or setting levers determining the point at which the said pawls shall pass into engagement with said gear-wheels and the distance said pawls shall during the subsequent downward motion of the exposed crank-handle rotate said wheels. The exposed actuating or setting levers are locked against all movement except when the outer operating crank-handle is at its lower position, and hence in the operation of the machine the crank-handle is first pulled to its lower position, and then the said actuating or setting levers are moved to their positions along the lines of numerals provided upon the front face of the register-casing. The first downward movement of the operating crank-handle performs no function with respect to registration, but releases the interior locking mechanism from the actuating or setting levers, so that the said levers may be moved to their proper positions. The subsequent downward motions of the operating crank-handle result in the registration of the preceding sale being effected. Thus after the operating crank-handle has been for the first time pulled to its lower position each subsequent downward motion of the said crank-handle effects the registration of the preceding amount denoted by the position of the actuating or setting levers and also denoted by the indicating cylinders or drums hereinafter referred to. The downward motion of the operating crank-handle also releases an interior spring, so that the latter may exert its force to close the shutter over the indicating cylinders or drums, and thus since the actuating or setting levers cannot be moved until the said operating crank-handle has been moved to its lower position the indicating cylinders or drums will upon the movement of the said actuating or setting levers be rotated to their proper positions while concealed by the said shutter, and thereafter upon the return of the said operating hand-lever to its upper or normal position the aforesaid interior spring will be compressed and placed under restraint and the said shutter will be moved downward from in front of the said indicating cylinders or drums, thereby to indicate to the customer the amount of the sale made.

The nature of the invention and satisfactory means for carrying the same into effect are described in full hereinafter and illustrated in the accompanying drawings, in which—

Figure 1 is a front elevation of a cash-register constructed in accordance with and embodying my invention. Fig. 2 is an end view of the same and illustrates the exposed operating crank or handle, by which registration is effected, in its normal upright position by full lines and in its lower or horizontal position by dotted lines, the full movement of said crank or handle being from its normal upright position to its lower horizontal position and then back to its normal upright position. Fig. 3 is a central vertical longitudinal section through the casing and cash-drawer of the register and illustrates the mechanism of the register (with the crank-handle omitted) in an end view. Fig. 4 is a front elevation of the interior mechanism of the register, the register-casing being omitted, the shutter for the indicating drums or cylinders being also omitted, and the supporting-arms for said shutter being in section. Fig. 5 is an enlarged front elevation, partly broken away, of several of the indicating cylinders or drums and the mechanism for operating the same, the shutter for said cylinders or drums being indicated in its lower or exposure position by dotted lines. Fig. 6 is a vertical longitudinal section of same on the dotted lines 6 6 of Fig. 5 and illustrates the shutter in its lower or exposure position by full lines and in its upper concealing position by dotted lines. Fig. 7 is an enlarged rear elevation, partly broken away, of a portion of the registering mechanism. Fig. 8 is a vertical longitudinal section of same on the dotted line 8 8 of Fig. 7, the crank-handle for clearness of illustration and explanation having its position indicated by dotted lines. Fig. 9 is a detached top view of one of the tilting frames utilized in the operation of carrying from one registering-wheel to another registering-wheel. Fig. 10 is a like view of a tilting frame utilized in the operation of carrying from one totalizing-wheel to another totalizing-wheel. Fig. 11 is a detached side elevation of same. Fig. 12 is a detached front elevation, partly broken away and partly in section, of a portion of the registering mechanism, this figure showing the units-of-cents registering-wheel and tens-of-cents registering-wheel. Fig. 13 is an end view of same looking at the right-hand end of Fig. 12 with the frame of the register omitted and the crank-handle shown by dotted lines. Fig. 14 is a detached side elevation of an operating cam-plate located adjacent to the right-hand end of the main operating or driving shaft of the register in near relation to the exposed crank-handle. Fig. 15 is a like view of a plate loosely mounted upon a rock-shaft in rear of the registering-wheel shaft and in the use of the register cooperating with the plate shown in Fig. 14. Fig. 16 is a like view of a plate rigidly mounted upon the rock-shaft in rear of the registering-wheel shaft and in close relation to the plate shown in Fig. 15. Fig. 17 is a detached top view showing the main operating-shaft of the register, the gear-wheels thereon for operating the registering-wheels, and the tilting frames for effecting the carrying from one registering-wheel to another and from one totalizing-wheel to another. Fig. 18 is a detached side view of one of the pawls forming a part of the mechanism for carrying from one registering-wheel to another and from one totalizing-wheel to another. Fig. 19 is a vertical longitudinal section through the main operating-shaft of the machine and illustrates a portion of the units-of-cents actuating gear-wheel, with means for locking said wheel against rotation except at the proper time. Fig. 20 is a front elevation, partly in section and partly broken away, of a portion of the interior mechanism of the register, this figure illustrating more particularly the means for locking the actuating or setting levers and maintaining them in their locked position until the exposed operating crank or handle has made its full downward motion to release said actuating or setting levers. Fig. 21 is an end elevation, partly broken away, of same.

In the drawings, 35 designates the exterior shell or casing of the register, 36 the cash-drawer, and 37 the spring, which is compressed during the closing of the cash-drawer and which when the cash-drawer is released from its locking devices drives said drawer to its open position in a well-known manner.

The actuating or setting levers are designated by the numeral 38, and these levers extend frontward through slots 39, formed in the front plate 40 of the register, which plate is furnished with columns of numerals 41 ranging from "0" to "9," inclusive, as illustrated in Fig. 1. The initial position of the levers 38 is at the lower end of the slots 39, and at the inner side of the front plate 40 are provided recessed bars 42, Fig. 3, which coact with the rollers 43, links 44, and springs 45 to enable the operator to properly control the levers 38, as explained in Letters Patent No. 640,825, granted January 9, 1900, to me for a cash-register. The actuating or setting levers 38 during their upward motion along the slots 39 perform two main functions, the first being to move the pivoted blocks 46, carried by them, upward along the upper curved arms 47 (see Fig. 8) of the pawls 48 without permitting during such upward movement of the levers 38 the said pawls 48 to engage the main register gear-wheels 49, and the second function performed by the actuating or setting levers 38 during their upward motion being through the vertical racks 50, Figs. 5 and 6, to actuate or set the indicating cylinders or drums 51. The main gear-wheels 49 for operating the registering-wheels are loosely mounted upon the main actuating or driving shaft 52 and always move in the same direction when actuated, and there is one main gear-wheel 49 provided for each of the actuating or setting levers 38, which also are adapted to turn freely upon the said main operating-shaft 52. Each of the gear-wheels 49 is equipped with a pawl 48 and other coacting devices, and the operation of said gear-wheels 49, pawls 48, and blocks 46, carried by the levers 38, will be fully described hereinafter.

The actuating or setting levers 38 are formed with the downwardly-extending arms 252, Fig. 6, whose lower ends are pivotally secured to racks 50, having along their upper sides the rack-teeth to mesh with the pinion-wheels 53, mounted upon the shaft 54 for the indicating cylinders or drums 51, each of the latter being furnished with one of the pinion-wheels 53 and with its pinion-wheel being free to revolve upon the said shaft 54 when actuated by a rack-bar 50, one of the latter being provided for each of said drums. The upward motion of the actuating or setting levers 38 thus effects the proper setting of their blocks 46 along the line of the upper curved arms 47 of the pawls 48 and also through the rack-bars 50 the proper turning of the cooperating indicating cylinders or drums 51. The rack-bars 50 have a substantially vertical movement and are guided at their upper portion by the bifurcated or recessed end of the guiding-bars 55, (see Fig. 6,) one guiding-bar 55 being provided for each rack-bar 50. The guiding-bar 55 is rigidly secured at its lower end and retains at its upper end the rack-bar 50 in proper alinement with and in near relation to its coöperating pinion-wheel 53 without binding unduly against the rear edges of said rack-bar. The teeth of the rack-bar 50 are pressed into the teeth of the pinion-wheel 53 by means of a flexed spring 56, whose upper end is constantly against the rear edges of said rack-bar for the purposes explained in the aforesaid patent, No. 640,825.

The indicating cylinders or drums 51 will be numbered from "0" to "9," inclusive, to correspond with the columns of numbers 41 on the front plate 40 and also to correspond with the like numerals on the registering-wheels, said indicating cylinders or drums 51 being mounted upon the transverse shaft 54, extending transversely within the upper contracted portion of the register-casing 35 in line with the front openings or windows 57, formed in the register-casing and illustrated in Figs. 1 and 3. The initial upward motion of the levers 38 results in the turning of the indicating cylinders or drums 51 to bring the proper numerals in line with the said openings or windows 57; but said numerals are concealed by means of a shutter 58 until such time as the said shutter is moved downward to its exposure position (shown in Fig. 6 by full lines and in Fig. 5 by dotted lines) by the upward motion of the exposed operating crank or handle 59, which is mounted upon the exposed end of the operating-shaft 52. When the shutter 58 is moved to its lower position, (shown by full lines in Fig. 6,) and this happens during the upward motion of the exposed crank-handle 59, the numerals on the indicating cylinders or drums 51 in line with the openings 57 are fully exposed to the purchaser. The shutter 58 is a plain piece of metal of proper width to close the openings 57 and is secured to arms 60, mounted on the shaft 54, and connected together by the rod 61, Figs. 5 and 6, whereby said arms 60 may have a simultaneous motion and move upward or bring downward the shutter 58. The rod 61 has connected with it the upper end of the link-rod 62, Figs. 5 and 6, whose lower end is pivotally secured to the lever-arm 63, fulcrumed upon the shaft 52, but substantially free of said shaft. The lower end of the rod 62 carries the bent or looped piece of wire 64, which at its lower looped end encompasses the shaft 65 and coöperates with said shaft 65 as a stop to prevent any undue upward motion of the rod 62 and shutter 58. Below the lever-arm 63 is disposed the spring 66, which is secured at its lower end to the shaft 65 and at its upper end is flexed against said lever-arm 63, as shown in Fig. 6, the said spring 66 exerting a constant upward tension against the said lever-arm 63 and through said lever-arm 63 against the link-rod 62 and shutter 58. The moving upward of the shutter 58 to close the window-openings 57 is effected by the spring 66 when the shaft 52 is turned toward the front of the register by the pulling downward of the crank-handle 59 to its horizontal position against the stop 67, provided therefor, as shown in Figs. 1 and 2, and said spring 66 is restrained from moving the shutter 58 upward to its concealing position until the shaft 52 has rotated toward the front of the register by means of the loop or stirrup 68, secured upon the shaft 52 in position to, when the crank-handle 59 is in its upright normal position, contact with the lever-arm 63, as shown in Fig. 6, and hold said arm down against the stress of the spring 66. When, however, the main shaft 52 is by means of the crank-handle 59 rotated toward the front of the register, it will carry the loop or stirrup 68 from the lever-arm 63 and leave the latter free to be moved upward by the spring 66 to the position indicated by the dotted lines in Fig. 6, this upward movement of the lever-arm 63 under the influence of the spring 66 serving to drive the link-rod 62 upward and elevate the shutter 58 to the position in which it is shown by dotted lines in Fig. 6 to conceal the indicating cylinders or drums. Thus it will be apparent that when the lever-arm 59 is in its upright normal position (shown by full lines in Fig. 2 and by dotted lines in Fig. 6) the stirrup 68 will by acting on the lever-arm 63 and link-rod 62 hold the shutter 58 in its lower or exposure position and that when the crank-arm 59 is pulled downward to its horizontal position (shown by dotted lines in Fig. 2) the spring 66 will lift the shutter 58 to its concealing position. The setting-levers 38 are locked against all movement when the crank-handle 59 is in its upper position, and said levers 38 are only released to be moved when the crank-handle 59 has reached its lower horizontal position, and thus since the levers 38 are only movable to operate the indicating cylinders or drums 51 when the crank-handle 59 is in its lower horizontal position it will be obvious that the person operating the machine will have concealed from his view the indicating cylinders or drums 51 while he is manipulating the levers 38 to indicate the amount of a sale. The shutter 58 will remain in its concealing position until the crank-handle 59 has been returned to its vertical position and the shaft 52 has carried the stirrup or loop 68 downward against the lever-arm 63 for pulling the link-rod 62 and shutter 58 downward. It will thus be understood that the crank-handle 59 is pulled downward to its lower position and the shutter 58 is moved to its upper or concealing position before the actuating or setting levers 38 can have any movement whatever and that after the crank-handle 59 has been pulled downward to its lower position and the actuating or setting levers 38 have been properly moved along the slots 39 in the front plate 40 of the register the crank-handle 59 will be returned to its upper or vertical position and through the stirrup 68 on the shaft 52 effect the downward movement of the shutter 58 to expose the indication through the windows or openings 57. The means for locking the actuating or setting levers 38 until the crank-handle 59 is moved to its lower horizontal position will be described hereinafter and are illustrated more particularly in Figs. 20 and 21.

The loop or stirrup 68 on the main shaft 52 in addition to coöperating with the lever 63 also coöperates with the locking-arm 69, which, as shown in Figs. 5 and 6, is hung upon the shaft 52 and is adapted at its lower end to engage the shoulder 70, formed on the cash-drawer 36, and to thereby lock said drawer in its closed position. When the crank-handle 59 is in its vertical position, the locking-arm 69 is free to engage the shoulder 70 of the cash-drawer and lock said drawer in its closed position; but when the loop 68 is carried toward the front by the downward motion of the crank-handle 59 it will contact with the short arm 71 of said locking-arm 69 and by depressing said short arm 71 turn the arm 69 upward to the position indicated by dotted lines in Fig. 6, free of the shoulder 70, at which time the spring 37 will be free to drive the cash-drawer 36 to its open position.

The registration is effected during the downward motion of the crank-handle 59 to its horizontal position, and it is well here to note that the downward movement of the crank-handle 59 actuates the registering-wheels to register the amount of the previous sale made. When the first sale is made, the crank-handle 59 is pulled downward to effect the elevation of the shutter 58 and the freeing of the actuating-levers 38. The actuating or setting levers 38 are then moved to their proper positions along the slots 39, and then the crank-handle 59 is returned to its upper position to lower the shutter 58 to its exposure position and lock the actuating or setting levers 38 against all movement. It will thus be seen that during this operation just described no registration has taken place. The registration of the first sale made, however, takes place when the crank-handle 59 is again moved downward to its horizontal position; but this will not usually occur until the second sale has been made, whereupon the pulling downward of the crank-handle 59 to free the levers 38 will result in the registration of the first sale being effected. The means for effecting the registration during the downward motion of the crank-handle 59 will now be described.

Upon the main driving-shaft 52 are freely mounted the gear-wheels 49, hereinbefore referred to, and above the driving-shaft 52 is mounted the registering-wheel shaft 75, upon which are arranged the registering-wheels 76, the latter bearing numerals from "0" to "9," inclusive, and being formed in one piece with or secured to the gear-wheels 77 and pinion-wheels 78, each registering-wheel 76 having a gear-wheel 77 and pinion-wheel 78, and one set of said wheels (76, 77, and 78) being provided for each of the gear-wheels 49 on the main shaft 52. The registering-wheels 76 receive their motion from the gear-wheels 49, which have an intermittent motion imparted to them, as hereinafter described, and always rotate in the same direction. The pinion-wheels 78 remain in constant mesh with the gear-wheels 49. The gear-wheels 77, connected with the registering-wheels 76, perform no part in the turning of the registering-wheels 76 to register; but they are utilized, as hereinafter described, in the setting back or restoring of the registering-wheels 76 to their zero position.

Adjacent to each of the main gear-wheels 49 a disk plate 79, Fig. 8, is secured upon the main shaft 52, and each of these plates 79 is provided with an outwardly-extending arm 80, to which the pawl 48 and its arm 47 are pivotally secured. To the plates 79 are secured springs 81, which are flexed against the lower side of the arms 47 of the pawls 48 and normally exert their force to drive the lower engaging end of the pawls 48 against the teeth of the gear-wheels 49. The force exerted by the springs 81 against the pawls 48 is normally held in check by the pivoted blocks 46, carried by the actuating-levers 38, since, as may be seen in Fig. 8, the outer edges of the arms 47 of the pawls 48 are on the line of a circle and in contact with the inner end of the pivoted blocks 46. While, therefore, pivoted blocks 46 of the levers 38 are against the arms 47 of the pawls 48, the lower ends of the latter are prevented by said blocks 46 from entering into engagement with the teeth of the gear-wheels 49. Thus the actuating-levers 38 normally keep the pawls 48 from engagement with the gear-wheels 49; but when under any conditions of the machine the arms 47 of the pawls 48 pass downward from contact with the pivoted blocks 46 of the actuating-levers 38 the springs 81, then free to fully act upon the arms 47, will cause the lower ends of the pawls 48 to pass into direct engagement with the teeth of the gear-wheels 49. The operation of the pivoted blocks 46, carried by the actuating-levers 38, and of the pawls 48 may be fully understood by a consideration of the operation of any one of said levers 38 with the coacting parts just referred to, and hence, looking at Fig. 8, if the actuating-lever 38 should be moved upward along the slot 39 in the front plate 40 of the register until said lever 38 were arrested at, say, the numeral "7" at the side of said slot, the block 46, carried by said lever 38, would move along the outer upper edges of the arm 47 of the pawl 48 and prevent the pawl 48 during such upward movement of the lever 38 from changing its position or passing into engagement with the gear-wheel 49. It will be remembered that the lever 38 cannot be moved upward along the slot 39 in the front plate 40 until the crank-handle 59 has been pulled downward to its horizontal position, and that it is necessary after the lever 38 is then moved upward that the crank-handle 59 be restored to its normal upright position. The lever 38 having been thus freed by the downward motion of the crank-handle 59 and then moved upward along the slot 39 in the front plate 40 to the suggested numeral "7" and said crank-handle 59 having been restored to its vertical position, the operation of registering the "7," denoted by the movement of the lever 38 and as then indicated on the indicating drum or cylinder 51, will be accomplished by the downward motion of the said crank-handle 59 to its horizontal position, this motion of the crank-handle 59 rotating the shaft 52, and with it the plate 79, carrying the pawl 48 and its arm 47. During this downward motion of the crank-handle 59 the arm 47 will move against the pivoted block 46, carried by the lever 38, until its upper end passes below said block, and at such time said arm 47 being then free from the restraint of the block 46 will under the influence of the spring 81 be forced outward and turn the lower end of the pawl 48 inward to engage the gear-wheel 49, and thereafter during the continued downward motion of the crank-handle 59 to its horizontal position the pawl 48, being then in engagement with the gear-wheel 49, will turn the latter and through the said gear-wheel 49 will rotate the pinion-wheel 78 and registering-wheel 76, thereby causing the registering-wheel to turn a distance equal to seven of the teeth of the pinion-wheel 78. The gear-wheel 49 is thus kept from moving under the influence of the pawl 48, except during such time as during the downward throw of the crank-handle 59 the arm 47 of said pawl is free of the pivoted block 46, carried by the actuating-lever 38. If the actuating-lever 38 had been moved upward only to, for instance, the numeral "3" at the edge of the slot 39 in the front plate 40, it will be obvious that the arm 47 of the lever 48 would remain under the restraint of the pivoted block 46, carried by the lever 38, a greater length of time than was the case when the lever 38 was moved upward, in the illustration, to the numeral "7" at the edge of the said slot 39, and hence it will be plain that the position of the lever 38 governs the time at which the arm 47 of the pawl 48 shall pass from under the influence of its pivoted block 46. The position of the lever 38, therefore, will determine the amount of movement the gear-wheel 49 and registering-wheel 76 shall have imparted to them by the pawl 48 during the downward throw of the exposed crank-handle 59. Each of the levers 38 is provided with a pivoted block 46, and each of the gear-wheels 49 has adjacent to it for its own operation a pawl 48, carrying the arm 47, and hence when occasion requires all of the levers 38 may be moved upward to indicate a sale, and upon the succeeding downward motion of the crank-handle 59 all of the pawls 48 will at the proper time be permitted to pass into engagement with their gear-wheels 49 and actuate the latter and through them the registering-wheels 76. The gear-wheels 49 are thus capable of individual motion and also of simultaneous motion with one another, and all of said gear-wheels during registration, while the crank-handle 59 is moving to its lower horizontal position, are operated by the pawls 48.

The pivoted blocks 46 are prevented from moving downward from their normal position (shown in Fig. 8) by suitable stop-pins 246, carried by the levers 38, and said blocks 46 are yieldingly held against said stop-pins 246 by means of the springs 247, also carried by the levers 38. The blocks 46 are pivoted so that they may yield upward slightly on the return upward movement of the arms 47 during the movement of the crank-handle 59 to its upright position, and thereby prevent any binding of the parts against one another.

The carrying from one register-wheel to another is performed by independent mechanism after the crank-handle 59 has reached its lower position, and this carrying mechanism will now be described.

The carrying from one register-wheel to another is performed after the exposed crank-handle 59 has reached its lower position, and the devices more intimately connected with the operation of carrying from one register-wheel to another comprise the rock-shaft 82, Figs. 7 and 8, the series of arms 83, loosely hung upon said rock-shaft, the series of stop-arms 84, rigidly mounted upon said rock-shaft 82, and the series of tilting frames 85, loosely mounted upon the shaft 65, which is below and to the rear of the rock-shaft 82. The series of tilting frames 85, there being three of these frames, are more clearly illustrated in Figs. 8, 9, and 17, and each of said frames is connected with a spring 86, which pulls downward on the rear ends of said frames and exerts a normal tension to tilt the front ends of said frames 85 upward. The frames 85 each comprise a short arm 87, Fig. 9, and longer arm 88, the shorter arm 87 having the raised portion or shoulder 89 and the longer arm of said frame 85 having the laterally-projecting lip 90. The shorter arm 87 of each frame 85 has pivotally secured to its front end the pawl 91, the said pawls 91 extending upward, as shown in Fig. 8, and normally engaging the main gear-wheels 49. The lower end or shank of the pawls 91 extends downward to the lower edges of the frames 85 and is engaged by the leaf-spring 92, (shown in Figs. 8 and 17,) which retain said pawls 91 normally against the gear-wheels 49 without preventing, however, said gear-wheels from slipping over the points of said pawls when occasion requires. During the carrying from one registering-wheel to another the frames 85 tilt upward under the influence of the springs 86, and the pawls 91 at such time effect the rotation of the gear-wheels 49 and through said gear-wheels 49 and the pinions 78 the rotation of the registering-wheels 76. The arms 83, loosely mounted upon the rock-shaft 82, remain in the normal position in which they are shown by full lines in Fig. 8, except when the registering-wheels make a complete revolution, and carry the arms 93, rigidly connected with the registering-wheels 76, against the short arms or fingers 94 of the said arms 83, and thereby throw the lower ends of said arms 83 rearward, this operation serving to free the lower ends of the arms 83 from the tilting frames 85. Each registering-wheel has as a part of its equipment the rigid arm 93, rotating therewith, a tilting arm 83, loosely mounted upon the shaft 82, and a stop-arm 84, rigidly connected with said shaft 82, and each of the registering-wheels to be carried to—that is, the tens-of-cents and units-of-dollars and tens-of-dollars registering-wheels—has as a part of its equipment a tilting frame 85, connected with a spring 86 and carrying a pawl 91. The location of the tilting frames 85 with respect to the gear-wheels 49, which operate the registering-wheels, is clearly indicated in Fig. 17. When the crank-handle 59 is in its normal upright position, the rock-shaft 82, arms 83, and stop-arms 84 will be in the normal position in which they are indicated by full lines in Fig. 8, and at such time the lower ends of the arms 83 will be directly over the lips 90, carried by the tilting frames 85, and said arms 83 will at such time prevent any upward tilting of the front ends of the said frames 85, and consequently will hold the springs 86 in check and prevent the pawls 91, carried by the frames 85, from moving upward and imparting rotary motion to the gear-wheels 49. When the shaft 82, arms 83, and stop-arms 84 are thus in their normal at-rest position, the stop-arms 84 will be free of the arms 87 of the tilting frames 85 and be located, as shown by the full lines in Fig. 8, a slight distance above the forward ends of the said arms 87, the extent of the space between the lower ends of the arms 84 and the upper edges of the front ends of the said arms 87 being equal to the space between two teeth of the gear-wheels 49. In order to understand this part of the mechanism a little more fully, it may be assumed that the exposed crank-handle 59 has been moved to its lower position and that, looking at Fig. 8, the arm 93, carried by the registering-wheel 76, on completing a revolution has contacted with the short arm or finger 94 of the arm 83 and has by such action moved the lower end of the arm 83 rearward from over the lip 90 of the tilting frame 85. Under such condition the spring 86 will, by pulling downward on the rear end of the frame 85, cause the front end of such frame 85 to move upward with the pawl 91 until the front end of the arm 87 of the frame 85 meets the lower end of the stop-arm 84, which arrests the upward movement of the front end of said frame 85. The upward movement just described of the front end of the frame 85 will cause the pawl 91 to move from the position in which it is shown by full lines in Fig. 8 to that in which it is shown by dotted lines in Fig. 8, and this upward movement of the pawl 91 has the effect of rotating the gear-wheel 49 a distance equal to the space between two of its teeth, and consequently moves the registering-wheel 76 a corresponding distance, this distance representing the amount to be carried from one registering-wheel to the next adjacent registering-wheel and occurring only after the preceding registering-wheel in series has made a complete revolution and carried its arm 93 against the short arm or finger 94 of the arm 83 to tilt the latter from over the lip 90 of the frame 85. The restoration of the frames 85 to their normal or horizontal position (shown in Fig. 8 by full lines) from their upper or tilted position (shown by dotted lines in Fig. 8) is accomplished during the return movement of the exposed crank-handle 59 to its upper horizontal position, and this operation is performed by a series of pins 95, secured upon the main operating-shaft 52 in position to, when the crank-handle 59 is moved to its vertical position, contact with the front ends of the arms 88 of the tilting frames 85 and push said arms 88 downward until the frames 85 reach their horizontal position, as shown in Fig. 8, and the lower ends of the arms 83 have swung frontward to a position over the lips 90 of said frames 85. The lower ends of the arms 83 are, as shown in Fig. 8, provided at their rear edges with fingers 96, which by contacting with the rear edges of the lips 90 of the frames 85 serve to arrest the arms 83 during their frontward-swinging motion, when said arms arrive at a proper position directly over the said lips 90.

It is desirable that the frames 85, carrying the pawls 91, by which, under the influence of the springs 86, the carrying is performed, shall remain in stationary position during the downward motion of the exposed crank-handle 59, since the registering is being performed during such downward motion of said crank-handle 59, and hence through the means hereinafter described the crank-handle 59 operates during the first part of its downward motion to give the shaft 82 a slight partial rotary motion in order that thereby the stop-arm 84, rigidly secured to and carried by said shaft 82, shall move rearward to a position directly above the elevated portion or shoulder 89 of the arms 87, constituting a part of the frames 85. When the stop-arms 84 are thus moved rearward over the said shoulders 89 of the frames 85, they will prevent the upwardly-tilting motion of the front ends of the said frames 85 during the downward travel of the crank-handle 59 to its lower horizontal position. At each downward motion of the crank-handle 59 to its lower or horizontal position the shaft 82 is rocked sufficiently by the means hereinafter described to carry the stop-arms 84 directly above the shoulder 89 of the arms 87, constituting a part of the tilting frame 85, and hence during the downward motion of the said crank-handle 59 the carrying mechanism is locked against movement, the springs 86 at such time being under restraint. If, however, during the downward motion of the crank-handle 59 to its lower or horizontal position a registering-wheel should complete a revolution and carry its arm 93 against the short arm or finger 94 of the arm 83, the lower end of the arm 83 will be moved rearward from over the lip 90 of the tilting frame 85 in order that upon the completion of the downward motion of the crank-handle 59 the tilting frame 85 may effect the carrying, and to this end the lower end of the arms 84 when moved rearward by the downward motion of the crank-handle 59 while passing directly over the shoulders 89 of the frames 85 do not directly contact with said shoulders, there being a very slight space left between the lower ends of the said stop-arms 84 and the upper edges of said shoulders 89, and this slight space is left between the lower ends of the stop-arms 84 and the upper edges of the said shoulders 89 in order that should the arm 83 by the completion of a revolution of a registering-wheel be moved rearward from over the lip 90 of the frame 85 the latter, under the influence of the spring 86, may tilt a very slight distance upward, not enough to effect the carrying, but simply enough to prevent the lower end of the arm 83 from swinging backward directly over the lip 90 of the frame 85, whereby the arm 83 will be enabled to swing back only to the rear edges of the lip 90, thereby leaving, under such a condition, the frame 85 in position to be tilted upward at its front end, so as to effect the carrying, after the crank-handle 59 has reached its lower position and permitted the stop-arms 84 to move frontward from over the shoulders 89 of the frames 85. Thus while the carrying from one registering-wheel to another is prevented during the downward motion of the exposed crank-handle 59 the arrangement of the mechanism is such that if during such motion of the said crank-handle a registering-wheel should complete a revolution the carrying will be done after the registration has been effected and upon the said crank-handle reaching its lower position. The parts connected with and operated by said crank-handle, while keeping the stop-arms 84 at their rear position over the shoulders 89 of the frames 85 during the downward motion of said crank-handle, also effect a reverse motion of the rock-shaft 82 and the return of the stop-arms 84 to their normal position (shown by full lines in Fig. 8) after the crank-handle 59 reaches its lower horizontal position. The carrying from one registering-wheel to another is thus accomplished by means of the tilting frames 85, carrying the pawls 91 in engagement with the gear-wheels 49 and actuated under the influence of the springs 86, and this carrying is performed just after the operation of registering has taken place and the exposed crank-handle 59 has arrived at its lower position, and means are provided, as indicated above, to prevent the actuation of the tilting frames 85 to effect the carrying until after the said crank-handle 59 has reached its lower position. The means for rocking the shaft 82, so as to move the stop-arms 84 rearward over the shoulders 89 of the tilting frames 85 on the starting downward of the crank-handle 59, and the means for reversing the motion of the rock-shaft 82, so as to cause said shaft to carry the arms 84 frontward from over the shoulders 89 of the tilting frames 85 after the crank-handle 59 has reached its lower horizontal position, are more fully illustrated in Figs. 12 to 16, inclusive, and are indicated on a small scale in Fig. 3, and this mechanism will be at once described.

Upon the right-hand end portion of the main operating-shaft 52, to which the crank-handle 59 is connected, is rigidly secured a plate 97, having at one end a cam-recess 98 and carrying on its inner face a pin 101, and upon the end of the rock-shaft 82 is loosely mounted the plate 102 (shown in Fig. 15) and rigidly mounted the plate 103, (shown in Fig. 16,) the plate 103 having at its lower front corner the recess 104 and being pivotally connected with the stop-arm 105, Fig. 13, whose lower bifurcated end straddles the shaft 65, which supports the tilting or carrying frames 85. The plate 103 on the rock-shaft 82 is engaged by a coiled spring 106, which normally exerts its force to pull said plate 103 downward and to turn thereby the rock-shaft 82 downward and frontward to its normal position. (Shown in Fig. 8.) The stop-plate 105, while permitting of the upward motion of the plate 103 to rock the shaft 82, with the stop-arms 84, rearward, prevents any undue downward motion of the said plate 103, and hence serves to arrest the rock-shaft 82 after the stop-arms 84 have moved frontward to their normal at-rest position, in which they are shown by full lines in Fig. 8.

The plate 102, loosely mounted or hung upon the rock-shaft 82, adjacent to the plate 103, carries a pin 107, and also carries upon the pin 108 a roller 109 and dog 110, as shown in Fig. 13. The roller 109 and dog 110 are at the outer side of the plate 102, and on its inner side said plate 102 carries the pivoted plate 111, (shown more clearly in Fig. 15,) said plate being secured upon the pin 112, the latter acting as a pivot, and said plate 111 when in its lower at-rest position resting upon, as a stop, the inner end of the pin 108, by which the roller 109 and dog 110 are secured upon the outer face of the said plate 102. The pin 112, which pivotally supports the plate 111 on the inner face of the plate 102, also supports the bell-hammer lever 113 for the gong 114, said bell-hammer lever 113 and gong 114 being well-known elements in this art. When the exposed operating crank-handle 59 is in its normal vertical position, as shown by full lines in Fig. 2 and by dotted lines in Fig. 13, the plates 97, 102, and 103, with the coöperating parts carried thereby, will be in the position in which they are illustrated by full lines in Fig. 13, and at such time the rock-shaft 82 and stop-arms 84, carried thereby, as well as the tilting or carrying frames 85, will be in their normal position, in which they are shown by full lines in Fig. 8. Upon the downward motion, however, of the exposed operating crank-handle 59 the plate 97 will, rotating with the main operating-shaft 52, be carried rearward against the roller 109, Fig. 13, and move its recessed portion 98 from said roller, thereby causing the larger periphery of the plate 97 to ride against the said roller 109, and effect thereby the rearward motion of the dog 110 against the plate 103, this having the effect of moving the plate 103 rearward and through said plate 103 turning the rock-shaft 82 rearward and carrying the stop-arms 84 from their normal position (shown in Fig. 8) to their rear position directly over the shoulders 89 of the tilting frames 85. The plate 103 will be maintained in its rear position, holding the stop-arms 84 in their rear position during all of the time that the crank-handle 59 is moving to its lower position and until the pin 99 on said plate 97 (the crank-handle 59 then having arrived at its lower position) reaches the front end of the dog 110, and thereby causes the rear or engaging end of said dog 110 to pass downward from engagement with the recess 104 of the plate 103, at which time the spring 106, acting against the plate 103, will instantly move the plate 103 downward, and thereby cause the rock-shaft 82 to turn the stop-arms 84 frontward to the position in which they are shown in full lines in Fig. 8. Thus by the means indicated the rock-shaft 82 and stop-arms 84 are moved rearward and kept rearward during the downward travel of the exposed operating crank-handle 59 and are when said crank-handle reaches its lower position restored to their normal position and condition to permit of the operation of carrying, should at such time it be necessary that the carrying from one registering-wheel to another take place. The downward thrust of the plate 103 under the action of the spring 106 will carry the pin 212 on said plate rapidly against the short arm of the bell-hammer lever 113 and cause said hammer to strike the gong 114. After the pin 99 on the plate 97 meets and trips the dog 110 the roller 109 will remain against the periphery or edge of the plate 97 by reason of the tension of the spring 202, Fig. 12, connected with the plate 102. It is of importance in the construction presented that during the downward motion of the exposed operating crank-handle 59 the rock-shaft 82 and stop-arms 84 be maintained in their rear position, for the reason, first, that when the stop-arms 84 are thus in their rear position they prevent the carrying from one registering-wheel to another during the downward travel of the crank-handle 59 and while registration is taking place, and, second, that if said stop-arms 84 were allowed to remain at their front position (shown by full lines in Fig. 8) they would prevent the wheels 49 from being rotated during the downward motion of the exposed crank-handle 59. It will be observed by the reference to Fig. 8 that when the stop-arms 84 are in their normal at-rest position (the position they occupy when the crank-handle 59 is in its vertical position) the lower ends of said arms 84 are in close relation to the pawls 91 and prevent said pawls from leaving the teeth of the gear-wheels 49. It is well here to note that the stop-arms 84 are at their front position (shown in Fig. 8) during the carrying from one registering-wheel to another, as hereinbefore described, and that in addition to preventing the front portion of the tilting frames 85 from ascending unduly under the influence of the springs 86 the said arms 84 also by keeping close against the pawls 91 compel said pawls to remain in mesh with the gear-wheels 49 during the tilting action of the frames 85. It will thus be understood that during the downward motion of the exposed crank-handle 59 the rearward movement of the arms 84 under the operation of the rock-shaft 82 and plates 97, 102, and 103, Figs. 12 to 16, inclusive, operates to free all of the said arms 84 from the pawls 91, and thus leaves the gear-wheels 49 in a condition in which they may be turned to effect registration during the downward motion of the crank-handle 59. During the downward motion of the crank-handle 59 and the rotation of the gear-wheels 49 the pawls 91 may slip over the teeth of the gear-wheels 49, since at such time said pawls 91 are only held against said gear-wheels 49 by the yielding springs 92. The gear-wheels 49 remain free to rotate under the influence of the pawls 48 until the operating crank-handle 59 reaches its lower position, and the pin 99 on the plate 97, Fig. 13, strikes the dog 110 and tilts said dog from the plate 103 to allow the spring 106 to restore the rock-shaft 82 and stop-arms 84 to their normal position, (shown in Fig. 8,) at which time the crank-handle 59 and pawls 48 having come to a stop the springs 86 may, if the carrying is to be done, tilt the frames 85 upward to effect the proper further rotation of the gear-wheels 49 under the action of the pawls 91.

It may be well here to note that during the downward motion of the operating crank-handle 59 the pin 101 on the plate 97, Fig. 14, and the tilting plate 111 on the plate 102, Fig. 13, remain idle, so far as performing any operation is concerned. During the downward motion of the operating crank-handle 59 the pin 101 on the plate 97 will meet the plate 111 on the plate 102, but will simply during such period tilt said plate 111 upward and pass to the upper side of the same, allowing said plate 111 to fall back to its lower position (shown in Fig. 15) against the inner end of the pin 108, which supports the roller 109 and dog 110. During the succeeding upward motion of the exposed operating crank-handle 59 the plates 97, 102, and 103 will be restored to their normal position, (shown in Fig. 13,) and during such upward motion of said crank-handle 59 the pin 99 on the plate 97 will pass downward from the front end of the dog 110, and the edge of the plate 97 will ride against the roller 109 until the recess 98 of said plate 97 reaches said roller, whereupon the said roller will pass into said recess 98, and the pin 100, carried by the plate 97, will meet the upper side of the front end of the dog 110 and by pressing on the same cause the rear end of said dog 110 to again enter the recess 104 of the plate 103. During the upward motion of the operating crank-handle 59 and the downward travel of the plate 97 consequent thereupon, the pin 101 on the inner side of the plate 97 will move against the frontwardly-projecting end of the plate 111, carried by the plate 102, and in doing so will move said plate 102, and through the contact of the pin 107 of said plate against the edge of the plate 103 will cause the plate 103 to move slightly rearward and remain in such position during a limited period of time (until the pin 101 passes the projecting end of the plate 111) in order that thereby the rock-shaft 82 may turn rearward and carry the stop-arms 84 to their rear position over the shoulders 89 of the tilting frames 85. This temporary rearward movement of the stop-arms 84 during the upward motion of the operating crank-handle 59 occurs after the carrying from one registering-wheel to another has taken place and is for the purpose of freeing the stop-arms 84 from the pawls 91, carried by the tilting frames 85, so that during the concluding portion of the upward motion of the exposed operating crank-handle 59 the pins 95 on the main operating-shaft 52 may upon meeting the front ends of the arms 88 of the tilting frames 85 restore said frames 85 to their normal position. (Shown by full lines in Fig. 8.) In the absence of some provision for releasing the arms 84 from the pawls 91 after the carrying has taken place, and while the exposed operating crank-handle 59 is moving to its upper position the tilting frames 85 could not be restored to their normal position by the pins 95 without effecting the reverse rotation of the gear-wheels 49. Thus during the downward motion of the operating crank-handle 59 the rock-shaft 82 is turned rearward through the instrumentality of the plates 97, 102, and 103, with their coöperating parts, so as to free the stop-arms 84 from the pawls 91 (thereby freeing the wheels 49) and to move said stop-arms 84 over the shoulders 89 of the tilting frames 85 to prevent carrying while the registration is taking place. When the operating crank-handle 59 has reached its lower position, the dog 110, Fig. 13, is tripped by the pin 99, so that the spring 106 may restore the rock-shaft 82 and stop-arms 84 to their normal position, thereby to assure the proper operation of the carrying from one registering-wheel to another, and during the upward motion of the crank-handle 59 the stop-arms 84, after the carrying has taken place, move rearward temporarily, so that the pins 95 on the main operating-shaft 52 may restore the tilting frames 85 to their normal position, whereupon the pin 101 on the plate 97 having passed the plate 111 on the plate 102 the plates 97, 102, and 103 regain their normal position, (shown in Fig. 13,) and the stop-arms 84 and rock-shaft 82 return to their normal position, (shown in Fig. 8,) said stop-arms 84 then holding the pawls 91 against the gear-wheels 49 and preventing the rotation of the latter except during the next succeeding downward motion of the crank-handle 59, when the stop-arms 84 will, as hereinbefore described, be again moved rearward to enable the pawls 48 during such downward motion of the crank-handle 59 to again rotate the wheels 49 for the purpose of registering. The first gear-wheel 49 in the series, or the one for operating the units-of-cents registering-wheel 76, will not be engaged by a pawl 91, connected with a tilting frame 85, since no carrying is done to the units-of-cents registering-wheel 76; but this first gear-wheel 49 should be locked against rotation except during such time as the rock-shaft 82, carrying the stop-arms 84, is turned rearward, and hence for the locking of the first gear-wheel 49 I provide a simple pawl-arm 115, as shown in Fig. 19, which will be carried by the rock-shaft 82, and thus be enabled to lock the said wheel 49 except when said rock-shaft is turned rearward.

The totalizing-wheels are numbered 116 and 117, respectively, Fig. 4, and these wheels, bearing the usual numerals, are connected with gear-wheels 118 and pinion-wheels 119, and these pinion-wheels 119 are in mesh with the gear-wheels 120, which correspond exactly with the gear-wheels 49 and are on the main shaft 52, in line with said gear-wheels 49, as shown in Figs. 4 and 17. For each of the totalizing-wheels 116 and 117 is provided an arm 83, corresponding exactly with the arm 83 shown in Fig. 8 for the registering-wheels, and for each of said totalizing-wheels is provided an arm 93, which upon making a complete revolution will trip the arm 83 in the manner hereinbefore described with respect to the mechanism clearly illustrated in Fig. 8. The totalizing-wheels 116 and 117 correspond with the registering-wheels 76, and the gear-wheels 120 for operating the totalizing-wheels correspond exactly with the gear-wheels 49 for the registering-wheels 76, but the gear-wheels 120 for the totalizing-wheels 116 and 117 are not operated by pawls 48, set in motion by the exposed crank-handle 59, the gear-wheels 120 for the totalizing-wheels 116 and 117 being, on the contrary, operated solely by tilting frames 121, (shown more fully in Figs. 10, 11, and 17,) which are engaged by springs 122, (see Fig. 4,) corresponding exactly with the springs 86 for the tilting frames 85, utilized to carry from one registering-wheel to another. At each revolution of the tens-of-dollars or final registering-wheel 76 the arm 93, connected with the pinion-wheel 78 of said tens-of-dollars registering-wheel, will trip the arm 83 from the tilting frame 121 of the totalizing-wheel 116 and allow the spring 122 for said frame 121 to move upward and carry its pawl 91 against the gear-wheel 120, in mesh with the pinion-wheel 119 for said totalizing-wheel 116, with the effect of causing said gear-wheel 120 and pinion-wheel 119 to turn said totalizing-wheel 116 a distance equal to one of the numerals on said totalizing-wheel. After the first totalizing-wheel 116 has made a revolution an arm 93, connected therewith, will trip the final arm 83 from the final tilting-frame 121 and allow the final spring 122 to tilt upward the front portion of the final tilting frame 121, and thereby effect through the pawl 91, carried by said frame 121, the rotation of the final gear-wheel 120, and through it the pinion-wheel 119, carried by the final totalizing-wheel 117, with the result that the final totalizing-wheel 117 will be moved a distance equal to one of the numerals on its periphery. The frames 121 (shown in Figs. 10, 11, and 17) for the totalizing-wheels are restored to their normal horizontal position by means of the pins 95 on the main operating-shaft 52 in the manner fully described with respect to the restoration of the tilting frames 85. (Shown in Figs. 8 and 9.) The tilting frames 121 for operating the totalizing-wheels correspond exactly with the frames 85 for the registering-wheels, with the exception that since only carrying is done to and by the totalizing-wheels the arms 87 of the frames 85 are not present, but are omitted from the frames 121 for the totalizing-wheels. The frames 121 for the totalizing-wheels are operated by the springs 122 in the same manner that the springs 86 operate the tilting frames 85 for the registering-wheels.

In the front part of the register-casing 35 will be provided a hinged door 125, which will be kept locked and the key thereto retained by the owner of the register or one having authority to inspect the interior thereof. When it is desired to "read" the totalizing-wheels and registering-wheels, the door 125 will be opened inward, as indicated by the dotted lines in Fig. 3, and the "reading" of the totalizing and registering wheels will be done through suitable slots in a guard-plate 126 of known construction. After the reading of the totalizing and registering wheels it will be desirable to restore the said totalizing and registering wheels to their zero position, and I illustrate the means for restoring the wheels to their zero position in Figs. 3, 4, 7, 8, 12, and 13, in which it will be observed that above and slightly to the rear of the registering-wheel shaft 78 is mounted a shaft 127, carrying loose gear-wheels 128 and rigid ratchet-wheels 129, the gear-wheels 128 being provided with spring-pawls 130 to engage said ratchet-wheels 129. The gear-wheels 128 on the shaft 127 are adapted to engage the gear-wheels 77, carried by the registering-wheels, and the gear-wheels 118, carried by the totalizing-wheels. The shaft 127 projects through the side of the register-casing and is provided on its exposed end with a knob or handle 131, by which the said shaft may be turned. The gear-wheels 77 and 118 are minus one tooth, as clearly illustrated in Figs. 8 and 13. In setting the registering and totalizing wheels back to their zero position the shaft 127 when freed by the unlocking of the door 125 and the movement of the parts connected therewith, as hereinafter described, will be rotated by hand to rotate the ratchet-wheels 129 and through the pawls 130 rotate the gear-wheels 128 on said shaft against the gear-wheels 77 and 118 of the registering and totalizing wheels, and the movement of said shaft 127 will continue until all of the gear-wheels 77 and 118 have been turned to present their blank spaces (where the tooth is absent) to the gear-wheels 128, said registering and totalizing wheels one after another reaching their zero position in a well-known manner. The gear-wheels 128 are free on the setting-back shaft 127, but the ratchet-wheels 129 are fast on said shaft 127, and hence when the shaft 127 is rotated in a proper direction the ratchet-wheels 129 will engage the pawls 130, carried by the gear-wheels 128, and effect the proper rotation of the latter. The shaft 127 for the setting-back gear-wheels 128 will be locked in rigid position, except when the front door 125 is open, and for the purpose of locking the shaft 127 I provide on its left-hand end, as shown in Fig. 4, a gear-wheel 132, which when the door 125 is closed will be engaged by a tooth on the pivot-arm 133, Fig. 3, and the front end of said arm 133 will be engaged by the crank-arm 134, rigid with the door 125, and so disposed with respect to the said door 125 that when said door is opened inward the said arm 134 will be moved upward from the arm 133 and free the shaft 127 and that when said door 125 is closed the said arm 134 will be moved directly over the front end of the arm 133 and lock the latter down against the said gear-wheel 132. The setting-back shaft 127 is thus locked by the closing of the door 125 and can only be operated to turn back the registering and totalizing wheels when said door 125 is opened to relieve the arm 134 from the arm 133.

In preparing to restore the registering-wheels and totalizing-wheels to their zero position the owner of the register will, if any of the actuating or setting levers 38 are in their upward position, first pull the crank-handle 59 to its lower position to free the said levers and effect the registration of the previous sale and then move the levers 38 to their zero position and restore the crank-handle to its vertical position, and thereupon prior to operating the shaft 127 the owner of the register will pull the crank-handle 59 slightly toward the front, so as to rock the shaft 82 to a sufficient extent to carry the stop-arms 84 rearward from the pawls 91, since said stop-arms 84 when against said pawls 91 will coöperate with said pawls in preventing the main driving gear-wheels 49 from rotating. When, therefore, the said levers 38 have been restored to their zero position and the crank-handle 59 has been pulled slightly forward, so as to rock the shaft 82 and relieve the stop-arms 84 from the pawls 91, the front door 125 of the register will be unlocked and the registering and totalizing wheels read, and thereupon the owner of the register will by operating the shaft 127 through the knob or handle 131 restore all of the registering and totalizing wheels to their zero position. If in preparing to read the register all of the levers 38 should at that time be in their down or zero position, the owner of the register will pay no attention to them, but will pull the crank-handle 59 slightly forward, as above described, to relieve the stop-arms 84 from the pawls 91.

The means for locking the actuating or setting levers 38, so that they cannot be moved until the crank-handle 59 has been pulled downward and permitted the shutter 58 to close the windows 57 in the front face of the register-casing, are illustrated more clearly in Figs. 20 and 21, in which it will be seen that upon the left-hand end of the main operating-shaft 52 is secured a cam-plate 135 and that upon each of the actuating or setting levers 38 is secured a segmental rack 136, while at a position to the front of said segmental racks 136 is mounted a sliding bar 137, having upwardly-extending arms 138, whose upper ends turn inwardly to form lips 139, adapted to engage the teeth of said segmental racks 136. When the levers 38 are in their lowermost position, the lips 139 of the bar 137 will lie over said segments 136, as shown in Fig. 21, and when any of the actuating-levers 38 are in their upper position the lips 139, connected with the bar 137, will pass into engagement with the teeth of said segments 136 and lock said levers in their respective positions. The lips 139 of the bar 137 are always in engagement with the segments 136, connected with the levers 38 when the crank-handle 59 is in its upper position, and said lips 139 are not relieved from the segments 136 of the levers 38 until the crank-handle 59 has been moved to its lower position. At one end of the bar 137 is formed the inwardly-extending arm 140, which is in position to be engaged by the cam-plate 137, carried by the driving-shaft 52 at all times, except when the crank-handle 59 is turned to its lower position and has thereby carried said cam-plate 135 below the engaging end of the said arm 140. When the cam-plate 135 is in engagement with the arm 140 of the bar 137, it will lock the bar against movement, and consequently it will retain the lips 139 of said bar in constant engagement with the segments 136. When, however, the crank-handle 59 is pulled downward and the cam-plate 135 is passed below the arm 140 of the bar 137, the coiled spring 146, connected with said bar 137, will cause the latter to have a limited longitudinal sliding motion sufficient to withdraw the lips 139 from the segments 136, and at this time, the crank-handle 59 being in its lower position, the actuating or setting levers 38 may be moved to any desired position along the line of slots 39 in the front face of the register-casing. After the actuating or setting levers 38 have thus been moved along the slots 39 to their desired position the crank-handle 59 is restored to its normal upright position, and while being restored to its upright position the crank-handle 59 will turn the shaft 52 and elevate the cam-plate 135 into contact with the arm 140 of the bar 137 and cause said bar 137 to slide laterally in opposition to the force of the spring 146 and restore the lips 139 into engagement with the segments 136, carried by the levers 38. The outer edge of the arm 140 of the bar 137 is inclined, as shown in Fig. 20, so that the cam-plate 135 may on its upward movement readily cause the bar 137 to slide toward the right in a direction from said cam-plate 135. The moment the cam-plate 135 passes below the arm 140 the spring 146 will withdraw the lips 139 from the segments 136, thereby freeing levers 38; but as soon as the crank-handle 59 starts upward to its normal position it will almost immediately act upon the bar 137 and restore the lips 139 into locking engagement with the segments 136, and while the crank-handle 59 is in its upper position the cam-plate 135 will remain against the bar 137 and cause the latter to maintain the levers 38 in locked position and condition.

In the construction of the means shown in Figs. 20 and 21 for locking the levers 38 the spring 146 moves the bar 137 in one direction and the cam-plate 135 in the opposite direction, and while I prefer the construction shown it is evident that on a reversal of the parts the spring might be employed for moving the bar 137 into a position for the lips 139 to engage the segments 136, while the cam-plate 135 might be employed for moving the bar 137 to carry the lips 139 from the said segments 136, this being a mere reversal of the function of the spring 146 and cam-plate 135, and therefore I do not limit the invention to the special arrangement of devices shown in Figs. 20 and 21.

The operation of the machine will probably be understood from the description hereinbefore given without further detailed explanation. The actuating or setting levers 38 are held against movement except when the operating crank-handle 59 is at its lower position, and hence the first step in the operation of the registering will be to pull down the crank-handle 59, so as to move the plate 135, Figs. 20 and 21, from the sliding bar 137 and permit the lips 139 of said bar to be carried from the racks 136, connected with the actuating or setting levers 38. This downward motion of the crank-handle 59 also, by carrying the loop or stirrup 68, Figs. 5 and 6, from the lever-arm 63, permits the spring 66 to close the shutter 58 over the windows 57 in front of the register-casing, so that the operator when moving the actuating-levers 38 may not be able to observe the rotation of the indicating cylinders or drums 51. The first downward motion of the crank-handle 59 does not effect any registration, but does release the actuating-levers 38 and permits the closing of the shutter 58. After the crank-handle 59 has for the first time been moved to its lower position the actuating-levers 38 will be moved along their slots 39 to the proper position to represent the amount of the sale and through the rack-bars 50 to rotate the indicating cylinders or drums 51, and thereupon the crank-handle 59 will be moved to its upper position and cause the shutter 58 to move to its lower position. (Shown by full lines in Fig. 6.) When the second sale has been made, the operator will again pull down the crank-handle 59 to release the levers 38 and effect the elevation of the shutter 58 to its concealing position, and this downward motion of the crank-handle 59 will effect the registration of the previous sale made by carrying the pawls 48 and their arms 47, Fig. 8, downward until the said arms 47 pass below the blocks 46, carried by the levers 38, and the lower ends of the pawls 48 pass into engagement with the gear-wheels 49, whereupon the continued downward motion of the said pawls 48 will result in the rotation of the gear-wheels 49 and registering-wheels 76. After the crank-handle 59 has reached its lower position and effected the registration, as just above indicated, the carrying, if any at that time is to be done, will be performed by pawls 91, carried by the tilting frames 85 under the influence of the springs 86, and while the said crank-handle 59 is at its said lower position the amount of the second sale will be indicated by the movement of the levers 38 along their slots 39 in a well-known manner, after which the crank-handle 59 will be again moved to its upper position and expose the indication of the second sale through the windows 57. When a third sale has been made, the operator will again pull down the crank-handle 59 to effect the registration of the second or previous sale and release the levers 38, so that said levers may be moved along their slots 39 to represent the third sale and effect the rotation of the indicating cylinders or drums 51 in accordance therewith, and thereupon, as before the crank-handle 59 will be restored to its upper position. This operation will be repeated as often as necessary, and when it is desired to "read" the registering and totalizing wheels and restore said wheels to their zero position the operator will pull the crank-handle 59 to its lower position to free the levers 38 and effect the registration of the previous sale, and then move the levers 38 to their zero position and restore the crank-handle 59 to its vertical position, and thereupon the operator will pull the crank-handle 59 slightly forward to rock the shaft 82 and release the stop-arms 84 from the pawls 91. The front door 125 of the register will then be unlocked, the registering and totalizing wheels read, and the registering and totalizing wheels restored to their zero position by the rotation of the shaft 127 through the medium of the knob or handle 131 thereon.

It is not intended to limit this application to the details of construction further than said details may be specifically pointed out in the claims, and these details in their form and arrangement in the broader scope of this invention will be varied at will in accordance with the size of the register to be produced and the will of the manufacturer. The cash-register shown in the drawings is provided with four of the actuating or setting levers 38; but these in number will vary as occasion may require. When a less number than four of the levers 38 is used, the number of indicating cylinders or drums 51 and registering-wheels 76 will be reduced accordingly.

Without, therefore, limiting myself to details of construction or forms of parts, what I claim as my invention, and desire to secure by Letters Patent, is—

1. In a cash-register, the registering-wheels, the hand setting-levers, the front plate having the series of numerals along which said levers may be moved in accordance with the values to be indicated, the blocks carried by said levers, the gear-wheels adjacent to said blocks for actuating the registering-wheels, and the driving-shaft upon which said gear-wheels are loosely mounted, combined with the pivoted pawls carried by said shaft for engaging and driving said gear-wheels, the arms connected with said pawls for coöperation with said blocks carried by said levers, and the exposed crank-handle for operating said shaft, said blocks carried by said setting-levers normally retaining said pawls from engagement with said gear-wheels but permitting said pawls to engage said gear-wheels during the motion of the said crank-handle and after the arms carried by said pawls have passed from contact with said blocks; substantially as set forth.

2. In a cash-register, the registering-wheels, the setting hand-levers, the front plate having the series of numerals along which said levers may be moved in accordance with the values to be indicated, the main driving-shaft, the gear-wheels loosely mounted on said shaft for actuating the registering-wheels, the pivoted pawls connected with said shaft for engaging and driving said gear-wheels and having the upwardly-extending curved arms, and the blocks carried by said setting-levers for engaging said curved arms and normally retaining said pawls from engagement with said gear-wheels, combined with the exposed crank-handle for operating said shaft, and the spring pressing said curved arms upward against said blocks carried by the setting-levers, said blocks by their engagement with said curved arms normally retaining said pawls out of engagement with the said gear-wheels but permitting the said pawls during the downward motion of the said crank-handle to engage said gear-wheels and rotate the latter; substantially as set forth.

3. In a cash-register, the registering-wheels, the setting hand-levers, the front plate having the series of numerals along which said levers may be moved in accordance with the values to be indicated, the main driving-shaft, the exposed crank-handle for driving said shaft and the parts carried thereby, and the gear-wheels loosely mounted on said shaft for actuating the registering-wheels, combined with the plates 79 rigidly mounted on said shaft, the pawls 48 pivotally secured to said plates and adapted for engagement with said gear-wheels to drive the same, the curved arms 47 connected with said pawls 48, the springs 81 carried by said plates 79 and flexed against said arms 47, and parts carried by said setting hand-levers for normally engaging said arms 47 and thereby retaining said pawls 48 from engagement with said gear-wheels but permitting the engagement of said pawls 48 with said gear-wheels after said arms 47 have passed below said parts carried by said setting hand-levers; substantially as set forth.

4. In a cash-register, the registering-wheels, the setting hand-levers, the front plate having the series of numerals along which said levers may be moved in accordance with the values to be indicated, the main operating-shaft, the exposed crank-handle for operating the same, the series of gear-wheels loosely mounted on said shaft for actuating the registering-wheels, and the pawls for engaging said gear-wheels to drive the same during the motion in one direction of said crank-handle, combined with means carried by said setting hand-levers for determining by the position of said levers the extent of motion said pawls may impart to said gear-wheels during the motion in one direction of said crank-handle, and means for locking said setting hand-levers against movement except when said crank-handle has been moved to free said levers; substantially as set forth.

5. In a cash-register, the registering-wheels, the setting hand-levers, the front plate having the series of numerals along which said levers may be moved in accordance with the values to be indicated, the driving-shaft, the exposed crank-handle thereon for driving said shaft, the gear-wheels loosely mounted on said shaft for actuating the registering-wheels, and the pawls carried by said shaft for engaging said gear-wheels to drive the same, combined with means carried by said setting hand-levers for normally retaining said pawls out of engagement with said gear-wheels and to govern, by the position of said hand-levers, the extent of the rotation said pawls shall impart to said gear-wheels and spring-actuated means for operating said gear-wheels and effecting the carrying from one registering-wheel to another after said crank-handle has been moved to effect registration; substantially as set forth.

6. In a cash-register, the registering-wheels, the setting hand-levers, the front plate having the series of numerals along which said levers may be moved in accordance with the values to be indicated, the main driving-shaft, the exposed crank-handle mounted on said shaft for operating the same, the gear-wheels loosely mounted on said shaft for actuating the registering-wheels, the pawls carried by said shaft for engaging said gear-wheels during the movement in one direction of the said crank-handle, and means controlled by said hand-levers for normally retaining said pawls out of engagement with said gear-wheels and determining, by the position given to said levers, the extent of rotation said pawls shall impart to said gear-wheels during the movement in one direction of said crank-handle, combined with the tilting frames 85 carrying the pawls 91 in engagement with said gear-wheels, the springs 86 connected with said frames and normally exerting their force to cause said pawls 91 to rotate said gear-wheels, means for limiting the throw of said pawls 91 under the influence of said springs 86, means normally restraining said frames 85 against movement, and means connected with said main shaft for restoring said frames 85 to their normal position after the carrying from one registering-wheel to another has been performed; substantially as set forth.

7. In a cash-register, the setting hand-levers, the front plate having the series of numerals along which said levers may be moved in accordance with the values to be indicated, the main driving-shaft, the exposed crank-handle mounted on said shaft for operating the same, the gear-wheels loosely mounted on said shaft for actuating the registering-wheels, the pawls carried by said shaft for engaging said gear-wheels during the movement in one direction of the said crank-handle, and means controlled by said hand-levers for normally retaining said pawls out of engagement with said gear-wheels and determining, by the position given to said levers, the extent of rotation said pawls shall impart to said gear-wheels during the movement in one direction of said crank-handle, combined with the tilting frames 85 carrying the pawls 91 in engagement with said gear-wheels, means for tilting said frames 85 to effect through said pawls 91 the rotation of said gear-wheels during the operation of carrying from one registering-wheel to another and after the operation of registering has ceased, the rock-shaft 82 carrying the stop-arms 84 for limiting the movement of said tilting frames 85, the registering-wheels having the arms 93 rotating therewith, and the arms 83 loosely mounted and having their fingers 94 in position to be met by the arms 93 carried by the registering-wheels at each rotation of the latter, while the lower ends of the said arms 83 normally engage said tilting frames and prevent the movement of the latter to effect carrying, except at the end of each rotation of the registering-wheels, when said arms 83 are, by the contact of the arms 93 with the fingers 94, moved from engagement with said tilting frames; substantially as set forth.

8. In a cash-register, the setting hand-levers, the front plate having the series of numerals along which said levers may be moved in accordance with the values to be indicated, the main driving-shaft, the exposed crank-handle mounted on said shaft for operating the same, the gear-wheels loosely mounted on said shaft for actuating the registering-wheels, the pawls carried by said shaft for engaging said gear-wheels during the movement in one direction of the said crank-handle, and means controlled by said hand-levers for normally retaining said pawls out of engagement with said gear-wheels and determining, by the position given to said levers, the extent of rotation said pawls shall impart to said gear-wheels during the movement in one direction of said crank-handle, combined with the registering-wheels having the arms 93 to rotate therewith, the tilting frames 85 carrying the pawls 91 normally in engagement with said gear-wheels for effecting the carrying from one registering-wheel to another, the rock-shaft 82 carrying the stop-arms 84, the loosely-hung arms 83 whose lower ends are normally over the frames 85 to prevent the movement of said frames 85 and whose fingers 94 are in position to be met by said arms 93 carried by the registering-wheels for the purpose of moving said arms 83 from contact with said tilting frames, and means connected with the said driving-shaft for rocking said rock-shaft and stop-arms 84 in one direction during the downward movement of said crank-handle, the said stop-arms 84 when said crank-handle is in its normal at-rest position being against said pawls 91 and above the tilting frames 85, and when the crank-handle has started from its normal position, being away from said pawls and over said tilting frames to prevent the carrying while the operation of registration is taking place; substantially as set forth.

9. In a cash-register, the registering-wheels, the setting hand-levers, the front plate having the series of numerals along which said levers may be moved in accordance with the values to be indicated, the main driving-shaft, the exposed crank-handle mounted on said shaft for operating the same, the gear-wheels loosely mounted on said shaft for actuating the registering-wheels, the pawls carried by said shaft for engaging said gear-wheels during the movement in one direction of the said crank-handle, and means controlled by said hand-levers for normally retaining said pawls out of engagement with said gear-wheels and determining, by the position given to said levers, the extent of rotation said pawls shall impart to said gear-wheels during the movement in one direction of said crank-handle, combined with means for rotating said gear-wheels to carry from one register-wheel to another after the said crank-handle has completed its movement to effect registration, and means for preventing the carrying from one registering-wheel to another until after the said movement of said crank-handle has been completed; substantially as set forth.

10. In a cash-register, the setting hand-levers, the front plate having the series of numerals along which said levers may be moved in accordance with the values to be indicated, the main driving-shaft, the exposed crank-handle mounted on said shaft for operating the same, the gear-wheels loosely mounted on said shaft for actuating the registering-wheels, the pawls carried by said shaft for engaging said gear-wheels during the movement in one direction of the said crank-handle, and means controlled by said hand-levers for normally retaining said pawls out of engagement with said gear-wheels and determining, by the position given to said levers, the extent of rotation said pawls shall impart to said gear-wheels during the movement in one direction of said crank-handle; combined with the registering-wheels, the arms 93 carried thereby, the tilting frames 85 carrying the pawls 91 in engagement with said gear-wheels for effecting the carrying from one registering-wheel to another, the springs 86 connected with said tilting frames, the rock-shaft 82 carrying the stop-arms 84 over the arms 87 of said tilting frames 85, the loosely-hung arms 83 having the fingers 94 normally in the path of said arms 93 and having their lower ends normally over the lips 90 of said frames 85, and means connected with the main driving-shaft for rocking said shaft 82 to carry the stop-arms 84 over the elevated portions or shoulders 89 of said tilting frames 85 and maintain them in said position during the operation of registration, said arms 84 during such period preventing the springs 86 from tilting the frames 85 to effect the carrying, while at the same time the arms 93 by meeting the fingers 94 may tilt or move the arms 83 from off the said lips 90 preparatory to the carrying being effected after the operation of registering has been completed; substantially as set forth.

11. In a cash-register, the setting hand-levers, the front plate having the series of numerals along which said levers may be moved in accordance with the values to be indicated, the main driving-shaft, the exposed crank-handle mounted on said shaft for operating the same, the gear-wheels loosely mounted on said shaft for actuating the registering-wheels, the pawls carried by said shaft for engaging said gear-wheels during the movement in one direction of the said crank-handle, and means controlled by said hand-levers for normally retaining said pawls out of engagement with said gear-wheels and determining, by the position given to said levers, the extent of rotation said pawls shall impart to said gear-wheels during the movement in one direction of said crank-handle, combined with the registering-wheels having the arms 93 rotating therewith, the tilting frames 85 comprising the arms 87, 88 and carrying the pawls 91 in contact with said gear-wheels, the springs connected with said tilting frames for effecting the carrying from one registering-wheel to another, the rock-shaft 82 carrying the stop-arms and normally supporting said arms against said pawls 91 and above said tilting frames 85 to limit the upward throw of the latter, means connected with said driving-shaft for moving said stop-arms 84 away from said pawls 91 and over the elevated portions or shoulders 89 of said tilting frames 85 to prevent the operation of the latter while the operation of registering is being carried on, and the arms 83 whose lower ends engage the lips 90 of the frames 85 and have the fingers 96 at one edge of said lower ends, the upper portions of said arms 83 having the fingers 94 in position to be struck by the arms 93 when the registering-wheels complete the rotation, thereby to effect the movement of the said arms 83 away from said lips 90 of the said tilting frames 85; substantially as set forth.

12. In a cash-register, the casing having the window-opening therein for exposing the indication, the hand setting-levers, the front plate having the series of numerals along which said levers may be moved in accordance with the values to be indicated, the rack-bars 50 operatively connected with said hand-levers to be moved by the latter, the indicating cylinders or drums having the pinions 53 in engagement with said racks 50, the transverse shaft upon which said indicating cylinders or drums and their pinions 53 are mounted, and the shutter 58 adapted to close the said window-opening, combined with the driving-shaft, the crank-handle upon the end of said shaft, the lever-arm 63 loosely mounted on said shaft, the loop or stirrup 68 carried by said shaft and adapted when said crank-handle is in its normal position to hold said lever-arm 63 in its lower position, the connecting-rod 62 intermediate said shutter and said lever-arm 63, and the spring 66 acting to move said lever-arm 63 and shutter 58 to their upper position when the said crank-handle is moved from its vertical position, whereby when the said crank-handle is moved from its normal position to release the hand setting-levers the spring 66 will move the shutter 58 to close the aforesaid window-opening and keep the same closed while the said setting-levers are operating the indicating cylinders or drums, and whereby also when the said crank-handle is moved to its vertical position the said spring 66 will be compressed and the lever-arm 63 will pull the said shutter 58 to its lower position; substantially as set forth.

13. In a cash-register, the hand setting-levers, the front plate having the series of numerals along which said levers may be moved in accordance with the values to be indicated, the racks 136 carried by said levers, the sliding bar 137 having the lips 139 in position to engage said racks 136 and thereby lock said hand setting-levers against motion, the main driving-shaft having the operating crank-handle on one end thereof, the plate 135 carried by said crank-shaft and adapted to engage said sliding bar 137 and retain the same with its lips 139 in engagement with said racks 136 while said crank-handle is in its vertical position and until said handle has been moved downward to its lower position, and the spring 146 for moving said bar 137 from said racks 136 after said bar is released from said plate 135, combined with the registering-wheels, the gearing for operating the same under the influence of said crank-handle, and means connected with said hand setting-levers for governing the throw of said registering-wheels; substantially as set forth.

14. In a cash-register, the hand setting-levers, the front plate having the series of numerals along which said levers may be moved in accordance with the values to be indicated, the racks 136 carried by said levers, the sliding bar 137 to engage said racks, the driving-shaft 52 having on its exposed end the operating crank-handle, and the plate 135 connected with said shaft and adapted to maintain the bar 137 into locking engagement with said racks 136 during all of the time that the said crank-handle is in its normal vertical position and while moving from such position to its lower horizontal position, combined with the registering-wheels, the gearing for actuating said registering-wheels under the influence of the said crank-handle, and means connected with said hand setting-levers for determining the extent of rotation said registering-wheels shall have with each movement in one direction of said crank-handle, substantially as set forth.

15. In a cash-register, the hand setting-levers, the front plate having the series of numerals along which said levers may be moved in accordance with the values to be indicated, the main driving-shaft 52 having on its exposed end the operating crank-handle 59, and means for locking said hand setting-levers against movement at all times while the said crank-handle is in its normal initial position and until said handle has been moved from its normal vertical position to its lower position to release the said hand setting-levers, combined with the registering-wheels, gearing adapted to be driven by said crank-handle on its downward motion for actuating said registering-wheels, and means connected with said hand setting-levers for determining the distance said registering-wheels shall be rotated by the downward motion of said crank-handle, substantially as set forth.

16. In a cash-register, the hand setting-levers, the front plate having the series of numerals along which said levers may be moved in accordance with the values to be indicated, the main driving-shaft having the exposed crank-handle thereon, the gear-wheels mounted on said shaft, pawls connected with said shaft for operating said gear-wheels when the crank-handle is pulled from its vertical to its horizontal position, means connected with said hand setting-levers for determining the distance said gear-wheels shall rotate with each downward movement of said crank-handle, the registering-wheel shaft, the registering-wheels 76 thereon, the gear-wheels 77 and pinions 78 connected with said registering-wheels and said pinions being in engagement with the said gear-wheels on the driving-shaft, the shaft 127 above the registering-wheel shaft, the gear-wheels 128 loosely mounted on said shaft 127 and in gear with the aforesaid gear-wheels 77, the ratchet-wheels 129 fast on said shaft 127, the pawls 130 secured to said gear-wheels 128 and engaging the teeth of said ratchet-wheels 129, and the handle 131 on the end of said shaft 127, said gear-wheels 77 each being minus one tooth so that under the rotation of said gear-wheels 128 said registering-wheels 76 may be brought to their zero position; substantially as set forth.

17. In a cash-register, the hand setting-levers, the front plate having the series of numerals along which said levers may be moved in accordance with the values to be indicated, the exposed operating crank-handle, the registering-wheels, the gear-wheels for actuating said registering-wheels, and means operable from said hand setting-levers for determining the amount of rotation said gear-wheels and registering-wheels shall have on each movement of said crank-handle, combined with means operable from said crank-handle for actuating said gear-wheels to rotate said registering-wheels, and means for locking said setting-levers against movement except when said crank-handle is moved from its normal position to free said levers, the registration being thus effected for the previous sale at each movement of said crank-handle to free said levers; substantially as set forth.

18. In a cash-register, the hand setting-levers, the front plate having the series of numerals along which said levers may be moved in accordance with the values to be indicated, the exposed operating crank-handle, the registering-wheels, the gear-wheels for actuating said registering-wheels, and means operable from said hand setting-levers for determining the amount of rotation said gear-wheels and registering-wheels shall have on each movement of said crank-handle, combined with means operable from said crank-handle for actuating said gear-wheels to rotate said registering-wheels, means rotating said gear-wheels to effect the carrying from one register-wheel to another and means for restraining the said carrying means against action during the movement of said gear-wheels to effect registration and for releasing said carrying means to act after registration has been effected; substantially as set forth.

19. In a cash-register, the hand setting-levers, the front plate having the series of numerals along which said levers may be moved in accordance with the values to be indicated, the exposed operating crank-handle, the registering-wheels, the gear-wheels for actuating said registering-wheels, and means operable from said hand setting-levers for determining the amount of rotation said gear-wheels and registering-wheels shall have on each movement of said crank-handle, combined with means operable from said crank-handle for actuating said gear-wheels to rotate said registering-wheels, means for rotating said gear-wheels to effect the carrying from one register-wheel to another, means for restraining the said carrying means against action during the movement of said gear-wheels to effect registration and for releasing said carrying means to act after registration has been effected, and means for locking said setting-levers against movement except when said crank-handle is moved from its normal position to free said levers and effect the registration of the previous sale; substantially as set forth.

Signed at New York, in the county of New York and State of New York, this 6th day of September, A. D. 1900.

ELIJAH F. SPAULDING.

Witnesses:
   CHAS. C. GILL,
   GUNDER GUNDERSON.